(12) United States Patent
Iwaki et al.

(10) Patent No.: US 7,074,380 B2
(45) Date of Patent: Jul. 11, 2006

(54) METHOD FOR MANUFACTURING CARBON FIBERS AND ELECTRON EMITTING DEVICE USING THE SAME

(75) Inventors: Takashi Iwaki, Tokyo (JP); Takeo Tsukamoto, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 430 days.

(21) Appl. No.: 10/661,626

(22) Filed: Sep. 15, 2003

(65) Prior Publication Data

US 2004/0060477 A1    Apr. 1, 2004

(30) Foreign Application Priority Data

Sep. 26, 2002 (JP) .............................. 2002-280784
Aug. 29, 2003 (JP) .............................. 2003-306157

(51) Int. Cl.
*D01C 5/00*  (2006.01)

(52) U.S. Cl. .............................. 423/447.3; 423/447.1; 977/887; 977/843

(58) Field of Classification Search ............. 423/447.3, 423/447.1; 977/887, 843
See application file for complete search history.

(56) References Cited

U.S. PATENT DOCUMENTS

| | | | | |
|---|---|---|---|---|
| 4,900,483 A | 2/1990 | Witzke et al. | ............. | 264/29.2 |
| 4,904,895 A | 2/1990 | Tsukamoto et al. | ......... | 313/336 |
| 5,847,495 A | 12/1998 | Yamanobe et al. | ......... | 313/310 |
| 5,973,444 A | 10/1999 | Xu et al. | .................... | 313/309 |
| 5,986,389 A | 11/1999 | Tsukamoto | ................. | 313/310 |
| 6,147,449 A | 11/2000 | Iwasaki et al. | ............. | 313/309 |
| 6,171,162 B1 | 1/2001 | Iwasaki et al. | ................ | 445/6 |
| 6,179,678 B1 | 1/2001 | Kishi et al. | .................... | 445/24 |
| 6,184,610 B1 | 2/2001 | Shibata et al. | ............. | 313/309 |
| 6,231,413 B1 | 5/2001 | Tsukamoto | ................... | 445/24 |
| 6,246,168 B1 | 6/2001 | Kishi et al. | ................ | 313/495 |
| 6,283,812 B1 | 9/2001 | Jin et al. | ....................... | 445/24 |
| 6,288,494 B1 | 9/2001 | Tsukamoto et al. | ...... | 315/169.1 |
| 6,383,047 B1 | 5/2002 | Minami et al. | ................ | 445/6 |
| 6,472,814 B1 | 10/2002 | Yamanobe et al. | ......... | 313/495 |
| 6,492,769 B1 | 12/2002 | Oda et al. | ................... | 313/495 |
| 6,515,640 B1 | 2/2003 | Tsukamoto et al. | ........ | 345/75.2 |
| 6,626,719 B1 | 9/2003 | Ono et al. | .................... | 445/24 |
| 6,628,053 B1 | 9/2003 | Den et al. | ................... | 313/310 |
| 2002/0009637 A1 | 1/2002 | Murakami et al. | .......... | 429/213 |
| 2002/0031972 A1 | 3/2002 | Kitamura et al. | .............. | 445/3 |

(Continued)

FOREIGN PATENT DOCUMENTS

EP    0 913 508 A2    5/1999

(Continued)

OTHER PUBLICATIONS

Cassell, A. M., et al., "Directed Growth of Free-Standing Single-Walled Carbon Nanotubes," 1999, American Chemical Society, Journal of the American Chemical Society, vol. 121, pp. 7975-7976.*

(Continued)

*Primary Examiner*—Colleen P. Cooke
*Assistant Examiner*—Rebecca M. Stadler
(74) *Attorney, Agent, or Firm*—Fitzpatrick, Cella, Harper & Scinto

(57) ABSTRACT

To provide an ink for producing a catalyst capable of stably forming metal particles which act as catalysts suitable for growth of carbon fibers by applying them onto a substrate.

A solution containing a metal organic compound containing any one metal of Pd, Fe, Co and Ni and a water-soluble polymer compound is formed by using water or an organic solvent as a main solvent.

16 Claims, 7 Drawing Sheets

U.S. PATENT DOCUMENTS

| | | | |
|---|---|---|---|
| 2002/0047513 A1 | 4/2002 | Nomura | 313/495 |
| 2002/0057045 A1 | 5/2002 | Tsukamoto | 313/309 |
| 2002/0060516 A1 | 5/2002 | Kawate et al. | 313/495 |
| 2002/0074947 A1 | 6/2002 | Tsukamoto | 315/169.3 |
| 2002/0117670 A1 | 8/2002 | Horiguchi et al. | 257/59 |
| 2003/0006684 A1 | 1/2003 | Kawate et al. | 313/311 |
| 2003/0048055 A1 | 3/2003 | Ishikura et al. | 313/311 |
| 2003/0048056 A1 | 3/2003 | Kitamura et al. | 313/311 |
| 2003/0048057 A1 | 3/2003 | Oyama et al. | 313/311 |
| 2003/0057860 A1 | 3/2003 | Tsukamoto | 315/169.3 |
| 2003/0073371 A1 | 4/2003 | Iwaki | 445/24 |
| 2003/0081931 A1 | 5/2003 | Nanba | 386/16 |
| 2003/0160180 A1 | 8/2003 | Arai et al. | 250/424 |
| 2003/0161942 A1 | 8/2003 | Arai et al. | 427/77 |
| 2003/0162465 A1 | 8/2003 | Mizuno et al. | 445/24 |
| 2003/0222560 A1 | 12/2003 | Roach | 313/311 |

FOREIGN PATENT DOCUMENTS

| | | |
|---|---|---|
| EP | 0 913 508 A3 | 5/1999 |
| EP | 1 022 763 A1 | 7/2000 |
| EP | 1 122 344 A2 | 8/2001 |
| EP | 1 187 161 A2 | 3/2002 |
| EP | 1 245 704 A2 | 10/2002 |
| EP | 1 291 891 A2 | 3/2003 |
| JP | 3-260119 | 11/1991 |
| JP | 08-115652 | 5/1996 |
| JP | 2903290 | 3/1999 |
| JP | 2000-200544 | 7/2000 |
| JP | 2000-223005 | 8/2000 |
| JP | 2000-243233 | 9/2000 |
| JP | 2002-69643 | 3/2002 |
| JP | 2002-150923 | 5/2002 |
| WO | WO 01/93292 A1 | 12/2001 |

OTHER PUBLICATIONS

C.A. Spindt et al., "Physical Properties of Thin-Film Field Emission Cathodes with Molybdenum Cones", *Journal of Applied Physics*, vol. 47, No. 12 (1976), pp. 5248-5263.

* cited by examiner

AXIS DIRECTION OF FIBER

AXIS DIRECTION OF FIBER

AXIS DIRECTION OF FIBER

METHOD FOR MANUFACTURING CARBON FIBERS AND ELECTRON EMITTING DEVICE USING THE SAME

BACKGROUND OF THE INVENTION

1. Field of the Invention

The present invention relates to a method for manufacturing carbon fibers and method for manufacturing an electron emitting device using the carbon fibers, method for manufacturing a display using the electron emitting device, and an ink for producing a catalyst for use in these methods.

2. Description of the Related Art

A field emission-type (FE-type) electron emitting device, wherein electrons are emitted from a metal surface by applying a strong electric field of $10^6$ V/cm or more toward a metal, has attracted attention as one of cold cathode electron-emitting devices. The practical use of the FE-type cold cathode electron-emitting device may enable realization of an emissive thin display device and contribute reduction of power consumption and weight saving.

FIG. 7 shows the structure of a vertical FE-type electron emitting device. In the FIG., 71 refers to a substrate; 72 to a extraction electrode (gate electrode); 73 to a cathode electrode; 74 to an insulating layer; 75 to an emitter. 76 to a positive electrode (anode) and 77 to a shape of an electron beam irradiated to a positive electrode 76. It has a structure (hereinafter referred to as Spindt type) wherein an opening is formed in a stack of the insulating layer 74 and the extraction electrode 72 arranged on the cathode electrode 73 and a conical emitter 75 is arranged in the opening (for example, see C. A. Spindt, "Physical Properties of thin-film field emission cathodes with molybdenum cones", J. Appl. Phys., 47, 5248 (1976)).

In addition, as an example of a lateral FE-type electron emitting device, there may be mentioned a device wherein an emitter having an acute tip and a extraction electrode extracting (drawing) out an electron from the emitter tip are formed parallel to a substrate and a collector (called as an anode in the present case) is constituted in the orthogonal direction toward the direction that the extraction electrode and the emitter face each other.

Furthermore, an electron emitting device using fibrous carbon has been proposed (for example, see Japanese Patent Application Laid-Open No. H08-115652, Japanese Patent Application Laid-Open No. 2000-223005, and European Patent Laid-Open No. 1022763).

As a method for manufacturing carbon fibers on the substrate, there is a method for manufacturing the same by disposing catalyst particles comprising a metal on the substrate and thermally decomposing a carbon compound such as a hydrocarbon using the catalyst particles as nuclei. As a method for disposing said catalyst particles onto the substrate, there is known a method of directly forming a catalyst metal by a depositing technology, e.g., a sputtering method. Also, a method of using a metal complex (for example, see Japanese Patent No. 2903290) and a method of using a metal nitrate or a metal chloride have been reported (for example, see Japanese Patent Application Laid-Open No. H03-260119)

SUMMARY OF THE INVENTION

A method of applying a solution of a metal compound dissolved in a solvent as a method for arranging a metal as a catalyst on a substrate is an advantageous process in the case of, for example, forming an electronic device using carbon fibers on a substrate having a large area since the process does not require a vacuum apparatus as compared with a method of direct deposition such as a sputtering method.

However, in the case of the application as a solution onto the substrate, a problem that particles are not stably formed after baking and reduction has arisen in the method of applying a solution in which only a metal compound is dissolved. Moreover, in the case of baking an inorganic salt such as a nitrate or a chloride, there is a possibility of generating a corrosive gas to damage the apparatus and the like.

Therefore, there is existed a problem that it is difficult to stably form catalyst particles for growing carbon fibers by a solution-applying method.

Namely, in order to manufacture carbon fibers to be applied to an electronic device including an electron emitting device as a representative, it is desired to develop a method for stably forming catalyst particles on a substrate without requiring any complex process.

An object of the present invention is to provide a method for manufacturing carbon fibers efficiently in a good yield ratio using an ink for producing a catalyst capable of stably forming metal-containing particles on a substrate, the particles acting as a catalyst suitable for growing the carbon fiber. Another object of the present invention is to provide a method for manufacturing an electronic device such as an electron emitting device having the carbon fibers and a method for manufacturing a display comprising the electron emitting device.

The invention has been accomplished as a result of extensive studies for solving the above-mentioned problem. The invention includes the following constitutions.

According to one aspect of the present invention, there is provided a method for manufacturing carbon fibers comprising:

a step of forming a coated film containing a metal organic compound and a polymer compound by applying an ink for producing a catalyst comprising a solution containing at least the metal organic compound and the polymer compound onto a substrate, a step of forming catalyst particles comprising a metal constituting the above metal organic compound by heating the above coated film, and a step of forming carbon fibers by bringing a gas containing carbon into contact with the above catalyst particles.

According to another aspect of the present invention, there is provided a method for manufacturing an electron emitting device containing carbon fibers connected to an electrode, comprising:

a step of forming a coated film comprising a metal organic compound and a polymer compound by applying an ink for producing a catalyst comprising a solution containing at least the metal organic compound and the polymer compound onto the electrode, a step of forming catalyst particles comprising a metal constituting the metal organic compound on the electrode by heating the coated film, and a step of forming carbon fibers by bringing a gas containing carbon into contact with the above catalyst particles.

In the above method for manufacturing carbon fibers and the above method for manufacturing an electron emitting device according to the invention, the following constitutions are included as preferred embodiments.

1) The polymer compound is a water-soluble polymer compound. In particular, the polymer compound is any one of polyvinyl alcohol, polyacrylic acids and polyvinylpyrrolidone.

2) The metal constituting the metal organic compound is any one of Pd, Fe, Co and Ni.

3) The metal organic compound is a metal organic complex.

4) A main solvent of the catalyst-manufacturing ink is water or an organic solvent.

5) The step of heating the coated film is carried out in a non-oxidizing atmosphere. Alternatively, the step is carried out by baking the coated film in an oxidizing atmosphere and then heating it in a reducing atmosphere.

6) The gas containing carbon is a hydrocarbon gas or a mixed gas of a hydrocarbon gas with hydrogen gas.

According to a further aspect of the present invention, there is provided an ink for producing a catalyst for growing carbon fibers, comprising at least a metal organic compound, a polymer compound and a solvent.

In the above catalyst-manufacturing ink according to the invention, the following constitutions are included as preferred embodiments.

1) The polymer compound is a water-soluble polymer compound. In particular, the polymer compound is any one of polyvinyl alcohol, polyacrylic acids and polyvinylpyrrolidone.

2) The metal constituting the metal organic compound is any one of Pd, Fe, Co and Ni.

3) The metal organic compound is a metal organic complex.

4) A main solvent of the catalyst-manufacturing ink is water or an organic solvent.

According to still another aspect of the present invention, there is provided a method for manufacturing a display using a plurality of electron emitting elements, wherein the electron emitting elements are manufactured by the method of the above second aspect of the invention.

According to the present invention, catalyst particles for growing carbon fibers can be stably formed by applying an ink for producing a catalyst containing a metal organic compound and a polymer compound onto a substrate, followed by heating. An electron emitting element grown from the catalyst particles and containing carbon fibers connected to an electrode exhibits a satisfactory electron emitting characteristics.

DESCRIPTION OF THE PREFERRED EMBODIMENTS

Figure 1A:
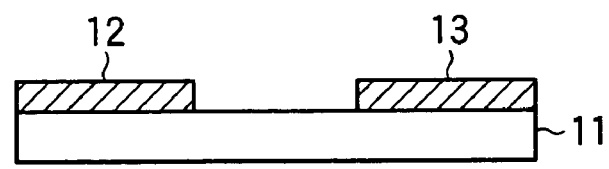
FIGS. 1A, 1B, 1C, 1D and 1E illustrate one example of the process for manufacturing an electron emitting element of the invention.

The following will describe the method for manufacturing carbon fibers and the method for manufacturing an electron emitting device as one example of electronic devices, and the catalyst-manufacturing ink for use in these methods according to the invention with reference to Embodiments. However, sizes, materials and shapes of the constituting parts and a relative position thereof described below should not be construed to limit the scope of the invention thereto. Also, the method for manufacture is not limited to the steps described below.

In this invetion, the "carbon fiber" or "fiber mainly composed of carbon" in the present invention. includes a carbon nanotube "hollow fiber", a graphite nanofiber (referring to a "fiber constituted by stacking graphenes in the axial direction of the fiber" or a "carbon fiber constituted by stacking a large number of graphenes having c-axis which is not perpendicular to the fiber axis" including a cup stack type), a carbon nanocoil (a spiral carbon fiber), carbon nanohorn (carbon fibers wherein one end of a carbon nanotube is closed), and an amorphous carbon fiber.

Moreover, the catalyst particles comprising a metal in the present invention. include not only particles composed of the metal alone but also particles mainly composed of the metal.

First, there is described the method for manufacturing carbon fibers of the invention using the catalyst-manufacturing ink of the invention.

In the method for manufacturing carbon fibers of the invention, an ink for producing a catalyst comprising a solution containing at least a metal organic compound and a polymer compound is applied onto a substrate.

It is to be noted that the "catalyst-manufacturing ink" in the present invention. means a liquid containing raw materials for forming desired catalyst particles but conceptually does not exclude a liquid having a function or purpose other than the formation of catalyst particles.

In the present invention, the metal constituting the metal organic compound contained in the catalyst-manufacturing ink is preferably a metal selected from noble metals such as palladium, platinum, rhodium, iridium, ruthenium and osmium, and first transition metals such as titanium, vanadium, chromium, manganese, iron, cobalt and nickel.

As the metal organic compounds containing the above noble metals, specifically, the metal organic compounds containing palladium include palladium acetylacetonates, palladium carboxylates such as palladium acetate, and the like, the metal organic compounds containing platinum include platinum acetylacetonates, platinum carboxylates such as platinum acetate, and the like, the metal organic compounds containing rhodinum include rhodium acetylacetonates, rhodium carboxylates such as rhodium octylate (dimer) and rhodium acetate (dimer), and the like, the metal organic compounds containing iridium include iridium acetylacetonates and the like, the metal organic compounds containing ruthenium include ruthenium acetylacetonates and the like, and the metal organic compounds containing osmium include osmium acetylacetonates and the like.

As the metal organic compounds containing the above first transition metals, specifically, the metal organic compounds containing titanium include titanium acetylacetonates, titanium oxide acetylacetonates and the like, the metal organic compounds containing vanadium include vanadium acetylacetonates, vanadium oxide acetylacetonates and the like, the metal organic compounds containing chromium include chromium acetylacetonates, chromium carboxylates such as chromium acetate, and the like, the metal organic compounds containing manganese include manganese acetylacetonates, manganese carboxylates such as manganese acetate, manganese formate and manganese benzoate, and the like, the metal organic compounds containing iron include iron acetylacetonates, iron carboxylates such as iron acetate, iron octylate, iron stearate and iron oxalate, and the like, the metal organic compounds containing cobalt include cobalt acetylacetonates, cobalt carboxylates such as cobalt acetate, cobalt naphthenate and cobalt oxalate, and the like, the metal organic compounds containing nickel include nickel acetylacetonates, nickel carboxylates such as nickel acetate, nickel formate and nickel stearate, and the like, the metal organic compounds containing copper include copper acetylacetonates, copper carboxylates such as copper acetate and copper benzoate, and the like. In addition, the metal organic compounds of the first transition metals also include metal carbonyl compounds, alkoxy metal compounds, cyclopentadienyl metal compounds and the like but these compounds are apt to be influenced by moisture, so that it is necessary to use an anhydrous organic solvent or the like when the compounds are used.

The above metal organic compound containing a noble metal or a first transition metal may be an organic complex to which a ligand coordinates. The ligand includes a compound coordinating with an oxygen (O) atom, a compound coordinating with an nitrogen (N) atom, or the like, but, preferred is a compound coordinating with a nitrogen (N) atom, such as amines, alcohol amines or ethylenediamines.

Among the above noble metals and first transition metals, palladium, iron, cobalt and nickel are preferably used as the metals constituting the metal organic compounds of the invention.

In particular, as the metal organic compounds containing palladium, preferred are palladium acetylacetonate, palladium carboxylates and the like.

Moreover, the palladium carboxylates may be coordinated by an amine ligand. For example, a compound coordinated by ammonia, ethanolamine, ethylenediamine or the like is also preferred. Tetra(monoethanolamine)palladium acetate or the like is a preferred compound for an aqueous system.

As the metal organic compounds containing iron, cobalt, or nickel, preferred are iron acetylacetonate, cobalt acetylacetonate, nickel acetylacetonate, iron alkylcarboxylates, cobalt alkylcarboxylates, nickel alkylcarboxylates and the like.

Furthermore, for carboxylates, also preferred is an amine ligand, for example, a compound coordinated by a nitrogen atom of ammonia, ethanolamine, ethylenediamine and the like. Moreover, a concentration range of the metal in the metal organic compound for use in the present invention. somewhat varies depending on the kind of the metal organic compound to be used, but is preferably from 0.005% to 1% by weight based on the weight of the solution (ink for producing catalyst). Too low metal concentration may invite too small amount of metal fine particles, and too high metal concentration tends to result in a metal film. Thus, it becomes difficult to form catalyst particles on a substrate.

Next, the polymer compound to be contained in the catalyst-manufacturing ink will be described.

In the present invention, the catalyst particles comprising a metal (particles mainly composed of the metal) can be stably formed by applying an ink for producing a catalyst which is a solution containing a metal organic compound and a polymer compound onto a substrate, followed by baking and reduction. This is because effects of the polymer compound have appeared at the application of the ink. The situation where the solvent is removed by drying after the application resembles the situation at an operation for recrystalization which is a method for purifying a solid compound. This is a situation where crystals of the metal organic compound in the metal organic compound may be precipitated on the substrate as large particles. However, since the polymer compound is present in the solution, the metal organic compound cannot freely move by the action of the polymer compound even when the metal organic compound is dispersed or the solvent is dried, and thus the metal compound remains dispersed. Therefore, discrete catalyst particles can be formed after baking and reduction.

The polymer compound according to the invention is preferably a water-soluble polymer compound. This is because a functional group for achieving the water solubility tends to interact with the metal organic compound and also with the substrate, and hence the functional group makes it easy to disperse the organic compound. As the water-soluble polymer compound, preferred are polyvinyl alcohol, polyvinylpyrrolidone and polyacrylates. The polyvinyl alcohol for use in the present invention, may contain polyvinyl alcohol partially esterified. Degree of polymerization of the water-soluble polymer compound is preferably in the range of 400 to 2000. When the degree of polymerization is smaller than the range, the metal organic compound is difficult to disperse sufficiently and when the degree of polymerization is larger than the range, viscosity of the solution becomes too high, and there arises a problem in its application. In order to disperse the metal organic compound without resulting in too high solution viscosity, it is preferable to use a polymer compound whose degree of polymerization is from 400 to 2000. The concentration of the water-soluble polymer compound for use in the present invention. is preferably from 0.01 to 0.5% by weight. When the compound is used within the range, a good dispersibility of the metal organic compound is achieved.

As the solvent for the catalyst-manufacturing ink of the invention, either water or an organic solvent can be preferably used as a main solvent. As the organic solvent to be used as the main solvent, use can be made of a solvent such as an alcohol such as methanol, ethanol, 1-propyl alcohol, 2-propyl alcohol, 2-butanol; an aromatic solvent such as toluene; or N-methylpyrrolidone, N,N-dimethylacetamide, N,N-dimethylformamide, dimethyl sulfoxide, or the like. These solvents may be used solely or as a mixture of two or more of them.

Moreover, as the solvent for the ink, in an aqueous solvent, an alcohol can be further added. As an alcohol to be added, use can be made of a monohydric alcohol mentioned in the above as the main solvent or a polyhydric alcohol such as ethylene glycol, propylene glycol, diethylene glycol glycerin and the like. The addition of such an alcohol may sometimes improve wettability.

In the method for producing carbon fibers of the invention, as the method of applying the above catalyst-manufacturing ink onto a substrate, a usual applying method such as spin coating, dipping, spray coating and the like can be employed. As other applying methods, liquid drop-applying methods including an ink-jet method such as a piezo system or a heating and bubbling system (bubble-jet, a registered trademark) as a representative can be also employed. The ink-jet method is preferably employed since a desired amount can be selectively imparted to a desired region. By these methods, a coated film containing the metal organic compound and the polymer compound is formed on a substrate.

Then, by heating (baking) the above coated film, catalyst particles comprising the metal constituting the metal organic compound contained in the ink is formed. The heating step will be described below.

For the heating step of forming catalyst particles comprising the metal constituting the metal organic compound by heating the coated film containing the metal organic compound and the polymer compound, a method of conducting in a non-oxidizing atmosphere and a method of heating in a reductive atmosphere after baking the coated film in an oxidizing atmosphere may be mentioned. In case where a polymer is removed, heating in an oxidizing atmosphere is preferable.

In the method of conducting in a non-oxidizing atmosphere, catalyst particles comprising the metal constituting the metal organic compound are formed through thermal decomposition of the metal organic compound by heating it under vacuum at about 500° C. to 700° C.

In the method of heating in a reductive atmosphere after baking the coated film in an oxidizing atmosphere, catalyst particles comprising the metal constituting the metal organic compound are formed by baking the metal organic compound at about 200° C. to 500° C., preferably about 350° C. to convert it into corresponding metal oxide and then reducing it under a hydrogen atmosphere at about 500° C. to 700° C.

After the catalyst particles are formed by heating the coated film, carbon fibers are grown using the catalyst particles. Namely, carbon fibers are formed by bringing a gas containing carbon into contact with the catalyst particles and simultaneously heating them. In other words, the carbon fiber is grown by bringing a gas containing carbon into contact with the catalyst particle, whose catalytic function is being activated. Typically, the carbon fiber can be grown by bringing a gas containing carbon into contact with the catalytic particle disposed on the base member which is being heated.

As the gas containing carbon for use in the present invention, a hydrocarbon gas such as acetylene, ethylene, methane, propane or propylene is preferably used, but the gas may be a vapor of an organic solvent such as ethanol or acetone. Moreover, a mixed gas of the above hydrocarbon gas with hydrogen gas is also preferably used. In the case that the mixed gas is used, when the coated film is baked in an oxidizing atmosphere, e.g., in the air, carbon fibers can be grown in a mixed gas stream of the hydrocarbon gas with hydrogen gas, without taking out a substrate, under a reduction treatment in a hydrogen gas stream with further flowing the hydrogen gas.

Figure 5A:
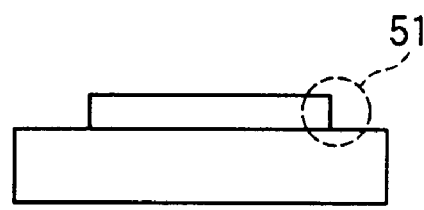
FIGS. 5A, 5B and 5C are schematic illustrations of structure of carbon nanotubes.
Figure 5B:
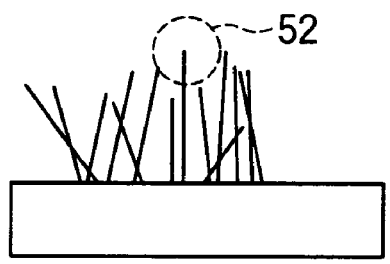
Figure 5C:
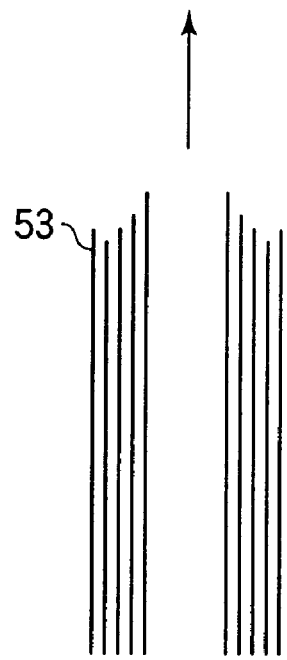
Figure 6A:
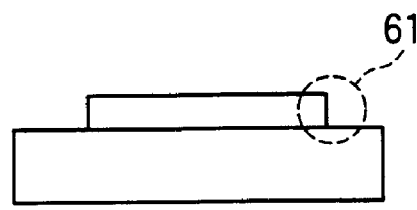
FIGS. 6A, 6B, 6C-1 and 6C-2 are schematic illustrations of structure of graphite nanofibers.

FIGS. 5A to 5C and 6A to 6C-2 show schematic illustrations of carbon fibers formed by decomposing a hydrocarbon gas using the above catalyst particles according to the invention. Each of FIGS. 5A and 6A shows a morphologic feature observed at an optical microscope level (the magnification of up to 1000).

Figure 6B:
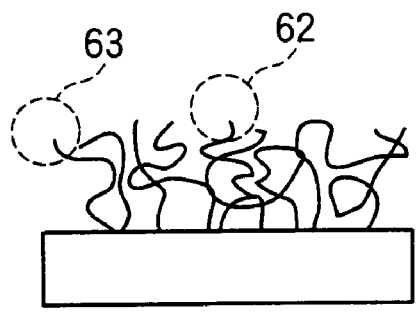
Figures 1, 6C:
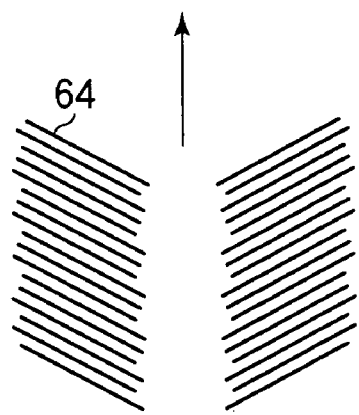
Figures 2, 6C:
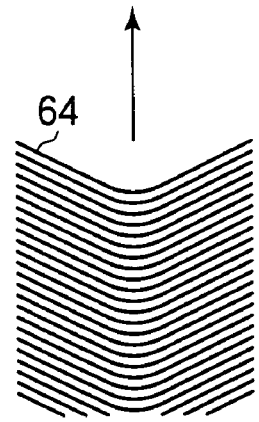
Figure 7:
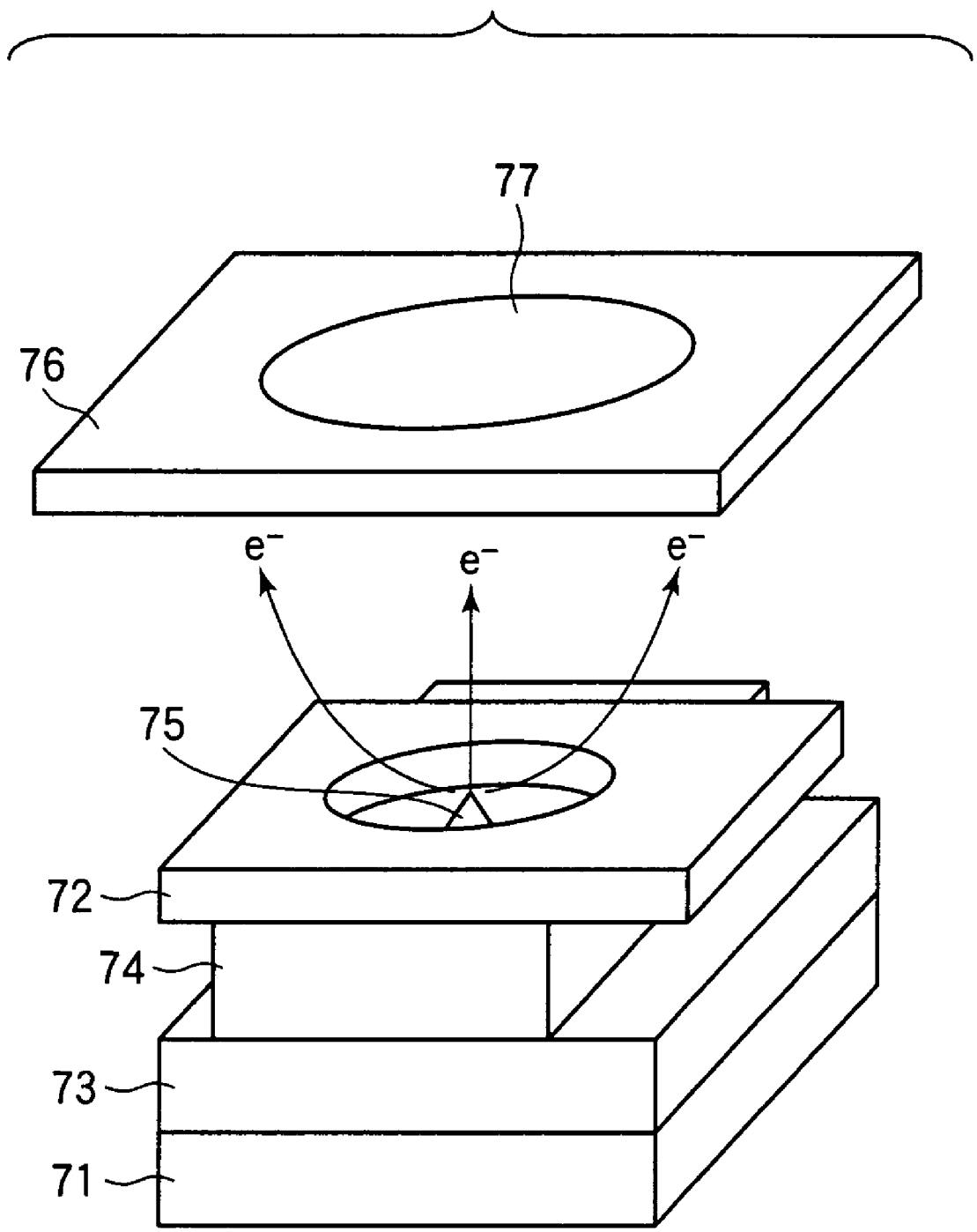
FIG. 7 illustrates a conventional vertical FE-type electron emitting element.

Each of FIGS. 5B and 6B shows a morphologic feature observed at a scanning electron microscope (SEM) level (the magnification of up to 30,000) and is an enlarged view of 51 and 61 in FIGS. 5A and 6A, respectively. Each of 5C, 6C-1 and 6C-2 shows a morphologic feature of carbon observed at a transmission electron microscope (TEM) level (the magnification of up to 1,000,000). FIG. 5C schematically illustrates an enlarged view of 52 in FIG. 5B, FIGS. 6C-1 schematically illustrates an enlarged view of 62 in FIG. 6B, and FIGS. 6C-2 schematically illustrates an enlarged view of 63 in FIG. 6B.

As shown in FIGS. 5A to 5C, the fiber wherein the 53 has a morphologic feature of cylindrical shape (the fiber having a multi-structured cylindrical shape of graphene is called a multi-wall nanotube) is called a carbon nanotube. In particular, when a tip of the tube has an opened structure, it exhibits the lowest threshold level.

Alternatively, FIGS. 6A to 6C-2 schematically illustrate the carbon fibers formed at a relatively low temperature similarly using a catalyst as in the case of the carbon nanotube. This type of carbon fiber (sometimes called a "graphite nanofiber") is constituted by stacked graphenes 64 in the axis direction of the fiber.

Either carbon fiber has a threshold level for electron emission of about 1 to 10 V/μm and has preferable characteristics as an electron emitting material. However, since the graphite nanofiber is superior in an electron emitting ability to the carbon nanotube, it is preferable to select the graphite nanofiber for an electron emitting device having carbon fibers.

The following will describe an electron emitting device using the carbon fiber obtained by the invention in detail with reference to FIGS. 1A, 1B, 1C, 1D, 1E, 2A and 2B.

Figure 2A:
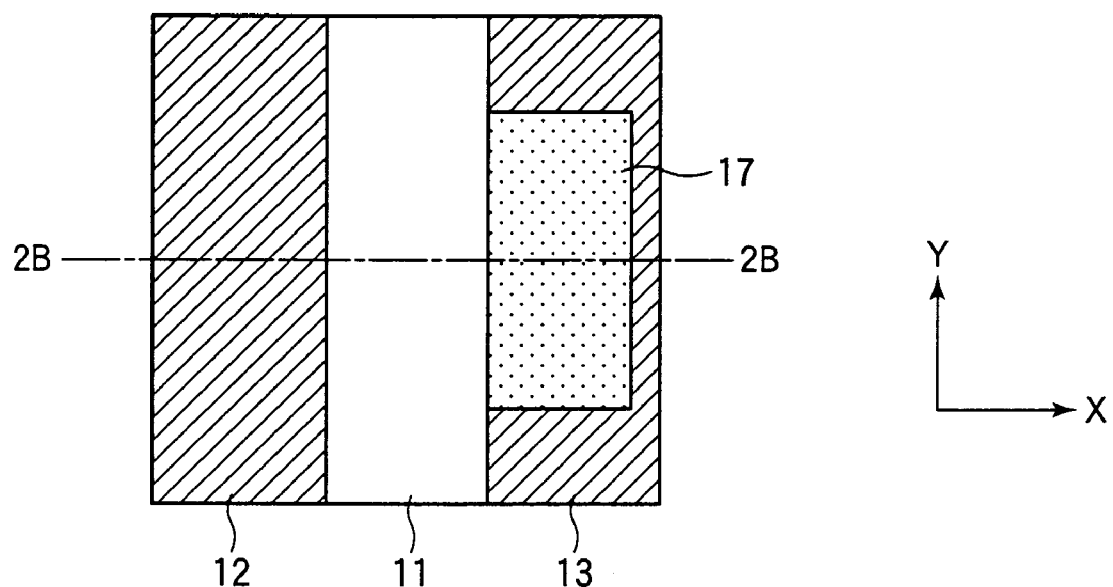
FIGS. 2A and 2B illustrate one example of the electron emitting element of the invention.
Figure 2B:
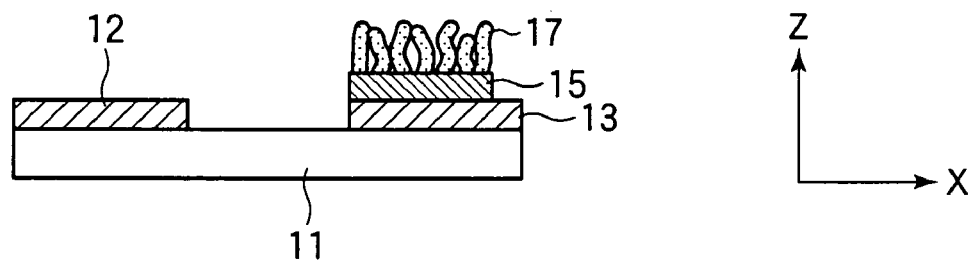

FIG. 2A is a schematic illustration showing one example of structure of the electron emitting device according to the invention and FIG. 2B is a cross-sectional view at 2B—2B in FIG. 2A. FIGS. 2A and 2B is a drawing after carbon fibers are grown using catalyst particles.

In FIGS. 1A, 1B, 1C, 1D, 1E, 2A and 2B, reference 11 denotes an insulating substrate; reference 12 denotes second electrode (extraction electrode (gate electrode) for. extracting electrons from the fiber, or control electrode for controlling electrons emitted from the fiber); reference 13 denotes first electrode (cathode electrode); reference 14 denotes a resist pattern; reference 15 denotes a conductive material layer; reference 16 denotes catalyst particles; reference 17 denotes carbon fibers which are materials for an emitter. Note that the conductive material layer 15 is not always necessary. In this example, the conductive material layer 15 where the first electrode 13 and catalyst particles 16 are arranged has a stacked structure, but it is sufficient for the layer to have a morphologic feature where catalyst particles 16 are exposed on the surface of the negative electrode 13. Namely, a morphologic feature where the first electrode 13 has catalyst particles 16 is also possible.

As the insulating substrate 1, an insulating substrate such as silica glass whose surface is thoroughly washed may be mentioned.

The second electrode 12 and the first electrode 13 are conductive and are formed by a general vacuum film-forming technology such as vapor deposition, sputtering and the like, a photolithography technology or the like. The material is desirably a heat-resistant material such as carbon, a metal, a metal nitride or a metal carbide.

The carbon fiber 17 is a carbon fiber such as a carbon nanotube or graphite nanofiber grown using catalyst particles 16 of FIGS. 1A to 1E (namely, catalyst particles obtained by forming a coated film containing a metal organic compound and a polymer compound by applying an ink for producing a catalyst containing the metal organic compound and the polymer compound and heating (baking) the above coated film).

The following will describe one example of the process for producing the electron emitting element shown in FIGS. 2A and 2B with reference to FIGS. 1A to 1E.

(Step 1)

After the substrate 11 is thoroughly washed, an electrode layer having a thickness of 500 nm (not shown in the Figure) is first formed all over the substrate by sputtering or the like in order to form the drawer electrode 12 and the negative electrode 13.

Next, in a photolithographic step, a resist pattern is formed using a positive photoresist (not shown in the Figure). Then, using the above patterned photoresist as a mask, the electrode layer is subjected to a dry etching using Ar gas to pattern the second electrode 12 and first electrode (cathode electrode) 13 having a gap between the electrodes (gap width) of 5 μm (FIG. 1A).

Hereinafter, the patterning of the thin layers and resists by a photolithography technology, film formation, lift-off, etching, and the like are simply referred to as "patterning".

(Step 2)

Figure 1B:
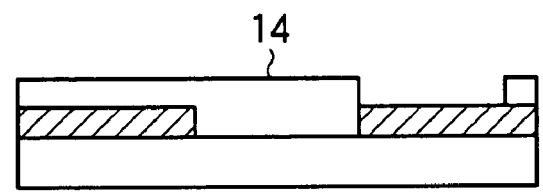

In a photolithographic step, the resist pattern 14 is formed using a negative photoresist to be used for successive lift-off of an upper layer (FIG. 1B).

Figure 1C:
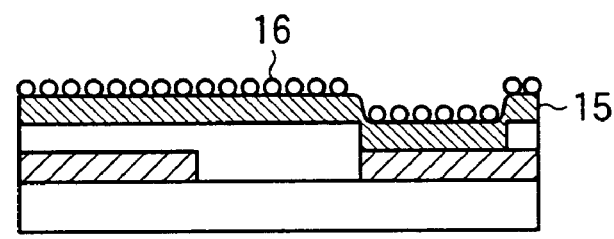

Next, therein is formed a conductive material layer (TiN is used therein) wherein carbon fibers 17 are grown using catalyst particles 16. Then, the catalyst-manufacturing ink is applied therein with rotation to form a coated film containing a metal organic compound and a polymer compound and then the film is heated to form catalyst particles 16 of the metal (FIG. 1C). In case where a polymer is removed, the above coated film is preferably heated in an oxidizing atmosphere. Further, when the areas of catalyst particles to be disposed are patterned (especially, when the patterning is carried out by a wet process), it is preferable to pattern the catalyst particles oxidized by heating the coated film in an oxidation atmosphere and then reduce the oxidized particles by heating them, for example, in a reduced gas atmosphere. Thus, the loss of a material constituting the catalyst particles with a peeling agent and solvent patterning can be suppressed. According to the invention, by adding a polymer, distance between neighboring catalyst particles can be arbitrarily controlled. Therefore, growth of carbon fibers using catalyst particles formed according to the invention results in control of the distance between carbon fibers. As a result, in the case that a large number of carbon fibers are grown on the first electrode 13 and are used as an electron emitting device, an electric field can be sufficiently applied to the individual carbon fibers and good electron emitting characteristics can be realized.

(Step 3)

Figure 1D:
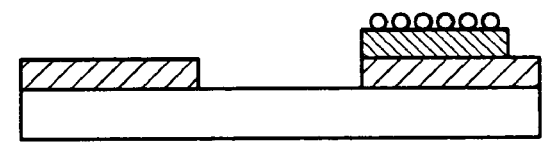

Using a removing liquid (remover) for the resist patterned in Step 2, the conductive material layer 15 and catalyst particles 16 on the resist are lifted off together with the resist and a pattern of the conductive material layer 15 and catalyst particles 16 is left in a desired region (FIG. 1D).

When a photosensitive material is further added to the ink for producing catalyst or when the photosensitivity is given to a polymer included in the ink for producing catalyst, after coated on the substrate with the previously patterned conductive material layer, the desirably patterned coated film comprising an organic compound and polymer is formed by the conventional photolithography techniques in which exposure and development are carried out using a mask. Next, a heating step is carried out in a non-oxidizing atmosphere, or a heating step is carried out in an oxidizing atmosphere and then a heating step is carried in a reducing atmosphere, to form catalyst particle pattern on the desired areas. Although the above heating step may be carried out in a non-oxidizing atmosphere, in case where a polymer is removed, baking in an oxidizing atmosphere is preferable.

(Step 4)

Figure 1E:
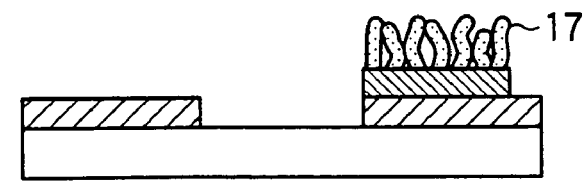

Subsequently, the product is subjected to a thermal decomposition (thermal CVD) treatment in a stream of a gas containing carbon. Then, when it is observed on a scanning electron microscope, it is found that a large number of carbon fibers are formed (FIG. 1E).

Figure 3:
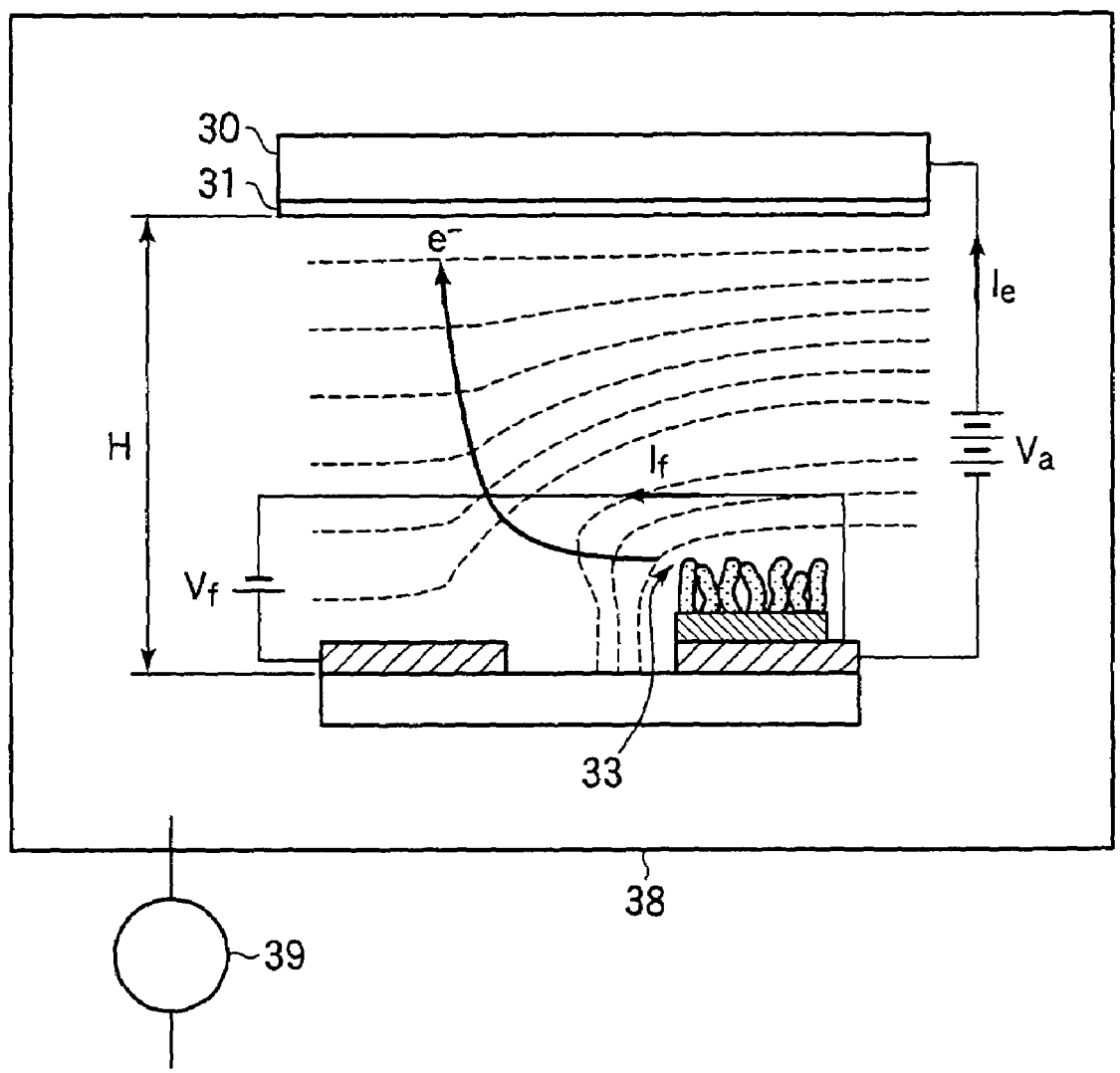
FIG. 3 illustrates a state at the time when the electron emitting element of FIGS. 2A and 2B is operated.
Figure 4:
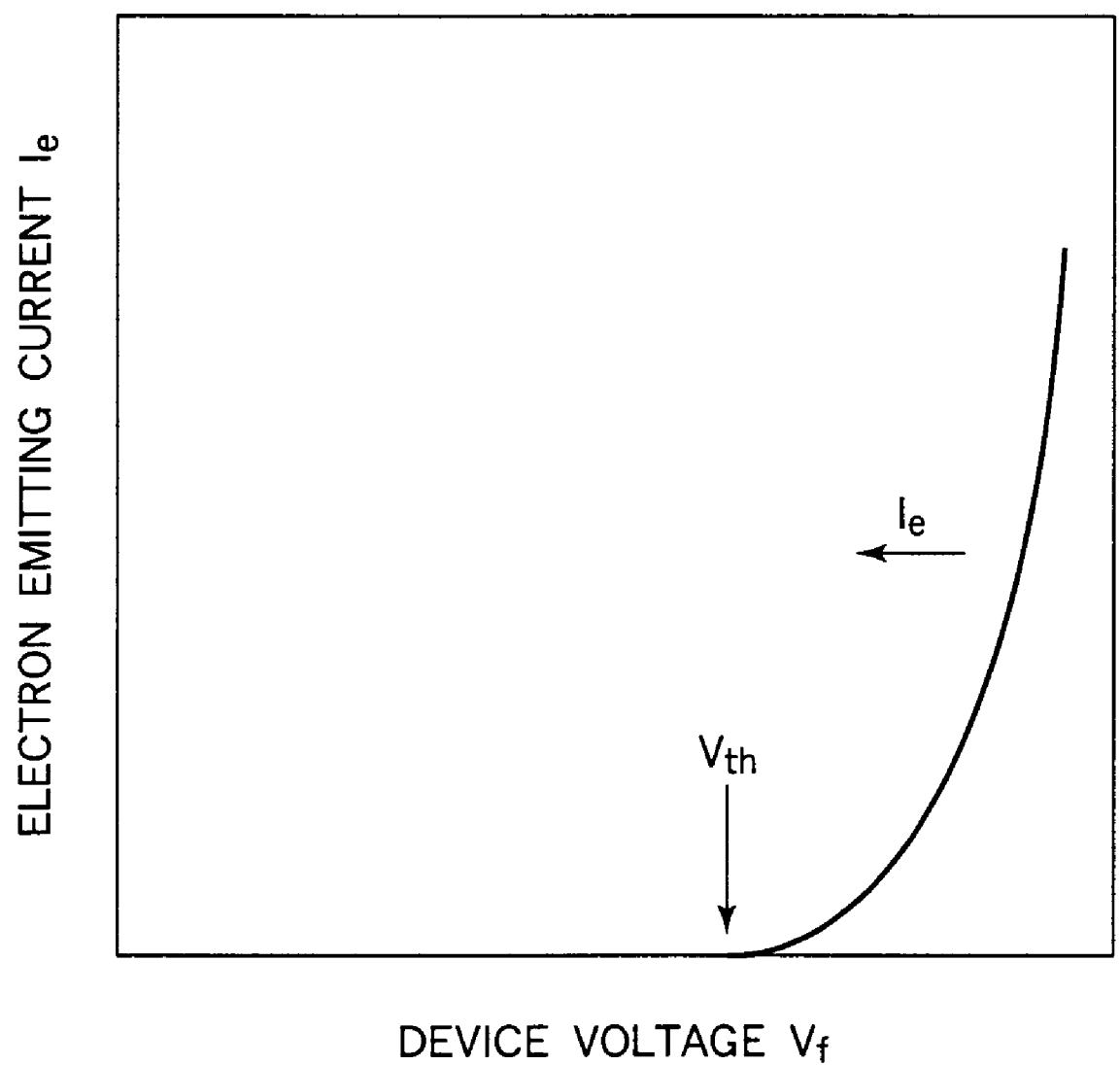
FIG. 4 illustrates an electron emitting characteristic of the electron emitting element according to the invention.

The following will describe the thus manufactured electron emitting device using the carbon fibers with reference to FIGS. 3 and 4.

The device equipped with the second electrode (gate electrode) 12 and the cathode electrode 13 having a gap between them of several μm, as shown in FIGS. 2A and 2B, is placed in a vacuum apparatus 38 as shown in FIG. 3 and the apparatus is thoroughly evacuated until the pressure reaches about $10^{-4}$ Pa by a vacuum evacuating apparatus 39. As shown in FIG. 3, using a high voltage source, a positive electrode (anode) 30 is provided at a position having a height H of several mm from the substrate and a high voltage of several kilo volts is applied.

In this connection, a fluorescent material 31 covered with a conductive film is provided to the anode electrode 30.

To the device (between the cathode electrode 13 and the gate electrode 12) is applied a pulse voltage of about several tens voltage as a driving voltage $V_f$, whereby a device current $I_f$ and an electron emission current $I_e$ are measured.

At that time, an equipotential line 32 is formed as shown in FIG. 3, and the point to which the electric field is most concentrated is assumed to be a place of the electron emitting materials (carbon fibers) nearest to the positive electrode 30 shown by 33 and inside of the gap.

It is considered that electrons are emitted from the place to which the electric field is most concentrated among the electron emitting materials positioned in the vicinity of the electric field-concentrated point.

The $I_e$ characteristic of the device was as shown in FIG. 4.

By arranging a plurality of the above electron emitting devices, a good display can be constructed.

EXAMPLES

The following will describe Examples of the invention in detail.

Example 1

Following the steps shown in FIGS. 1A to 1E, an electron emitting device was manufactured.

(Step 1)

After an quartz substrate used as the substrate 11 is thoroughly washed, first, an underlying Ti having a thickness of 5 nm and Pt having a thickness of 100 nm not shown in the Figure were continuously vapor-deposited onto all over the substrate by sputtering in order to form the etraction electrode 12 and the cathode electrode 13.

Next, in a photolithographic step, a resist pattern is formed using a positive photoresist not shown in the Figure.

Then, using the above patterned photoresist as a mask, the Pt and Ti layers were subjected to a dry etching using Ar gas to pattern the extraction electrode 12 and cathode electrode 13 having a gap between the electrodes (gap width) of 5 μm.

(Step 2)

In a photolithographic step, a resist pattern 14 is formed using a negative photoresist to be used for subsequent lift-off of an upper layer. Next, a TiN layer was formed as the conductive material layer 15.

An ink for producing a catalyst was prepared by mixing 0.44 g of tetrakis(monoethanolamine)palladium acetate, 0.05 g of polyvinyl alcohol, 25 g of isopropyl alcohol, and 1 g of ethylene glycol and making the whole amount 100 g by addition of water. The ink was spin-coated onto the above TiN layer and baked at 350° C. for 30 minutes in the air, and then the resulting ink was subjected to a reduction treatment at 600° C. in a hydrogen stream to form catalyst particles 16. When the particles were observed on a scanning electron microscope (SEM), Pd particles were formed on the TiN layer.

(Step 3)

Using a removing liquid for the resist patterned in Step 3, the conductive material layer 15 and catalyst particles 16 on the resist are lifted off together with the resist and a pattern of the conductive material layer 15 and catalyst particles 16 was left in a desired region.

(Step 4)

Subsequently, a thermal treatment was carried out in an ethylene stream. Then, when it was observed on a scanning electron microscope, it is found that a large number of carbon fibers 17 were formed.

The electron emitting device manufactured as above was placed in a vacuum apparatus 38 as shown in FIG. 3 and the apparatus was thoroughly evacuated until the pressure reached $2\times10^{-5}$ Pa by a vacuum evacuating apparatus 39. A voltage $V_a$ of 10 kV is applied to the positive electrode 30 apart from the device by H=2 mm. At that time, to the device was applied a pulse voltage of a driving voltage $V_f$ of 20 V, whereby a device current $I_f$ and an electron emission current $I_e$ were measured.

$I_f$ and $I_e$ characteristics of the device were those as shown in FIG. 4. Namely, $I_e$ rapidly increased from about a half of the applied voltage and when $V_f$ was 15V, an electron emission current $I_e$ of about 1 µA was observed. On the other hand, $I_f$ was similar to the $I_e$ characteristic but the value was found to be a value smaller than that of $I_e$ by one order or more.

Example 2

An electron emitting device was manufactured in the same manner as in Example 1 with the exception that Step 2 was carried out as follows, and $I_f$ and $I_e$ thereof were measured.

(Step 2)

In a photolithographic step, a resist pattern 14 is formed using a negative photoresist to be used for subsequent lift-off of an upper layer. Next, a TiN layer was formed as the conductive material layer 15.

An ink for producing a catalyst was prepared by mixing 0.42 g of cobalt acetate tetrahydrate, 0.05 g of polyvinyl alcohol, 25 g of isopropyl alcohol and 1 g of ethylene glycol and making the whole amount 100 g by addition of water. The ink was spin-coated onto the TiN layer and baked at 350° C. for 30 minutes in the air. According to the above steps, the cobalt oxide particles are produced. Next, the conductive material layer 15 and oxide particles on the resist 14 are lifted off with a peeling liquid for the resist, and then a heating process is carried out at 600° C. in a hydrogen stream to reduce the cobalt oxide particles to the metal cobalt particles.

When the particles were observed on a scanning electron microscope (SEM), Co particles were formed on the TiN layer. A heating process is further carried out in an ethylene stream to produce a carbon fiber from cobalt particles. In this working example, since elution into a peeling liquid is more suppressed by patterning the oxidized cobalt, a reducing process was carried out after patterning the oxidized particles.

$I_f$ and $I_e$ characteristics of the resulting electron emitting device were those as shown in FIG. 4. Namely, $I_e$ rapidly increased from about a half of the applied voltage and when $V_f$ was 15V, an electron emission current $I_e$ of about 1 µA was observed. On the other hand, $I_f$ was similar to the $I_e$ characteristic but the value was found to be a value smaller than that of $I_e$ by one order or more.

Example 3

An electron emitting device was manufactured in the same manner as in Example 1 with the exception that Step 2 was carried out as follows, and $I_f$ and $I_e$ thereof were measured.

(Step 2)

In a photolithographic step, a resist pattern 14 is formed using a negative photoresist to be used for subsequent lift-off of an upper layer. Next, a TiN layer was formed as the conductive material layer 15.

An ink for producing a catalyst was prepared by mixing 0.42 g of nickel acetate tetrahydrate, 0.05 g of polyacrylic acid, 25 g of isopropyl alcohol and 1 g of ethylene glycol and making the whole amount 100 g by addition of water. The ink was spin-coated onto the TiN layer and baked at 350° C. for 30 minutes in the air, and then the resulting ink was subjected to a reduction treatment at 600° C. in a hydrogen stream to form catalyst particles. When the particles were observed on a scanning electron microscope (SEM), Ni particles were formed on the TiN layer.

$I_f$ and $I_e$ characteristics of the resulting electron emitting device were those as shown in FIG. 4. Namely, $I_e$ rapidly increased from about a half of the applied voltage and when $V_f$ was 15V, an electron emission current $I_e$ of about 1 µA was observed. On the other hand, $I_f$ was similar to the $I_e$ characteristic but the value was found to be a value smaller than that of $I_e$ by one order or more.

Example 4

An electron emitting device was manufactured in the same manner as in Example 1 with the exception that Step 2 was carried out as follows, and $I_f$ and $I_e$ thereof were measured.

(Step 2)

In a photolithographic step, a resist pattern 14 is formed using a negative photoresist to be used for subsequent lift-off of an upper layer. Next, a TiN layer was formed as the conductive material layer 15.

An ink for producing a catalyst was prepared by mixing 0.63 g of iron acetylacetonate and 0.06 g of polyvinylpyrrolidone and making the whole amount 100 g by addition of ethanol. The ink was spin-coated onto the TiN layer and subjected to a thermal treatment at 600° C. under vacuum.

When the product was observed on a scanning electron microscope (SEM), Fe particles were formed on the TiN layer.

$I_f$ and $I_e$ characteristics of the resulting electron emitting device were those as shown in FIG. 4. Namely, $I_e$ rapidly increased from about a half of the applied voltage and when $V_f$ was 15V, an electron emission current $I_e$ of about 1 μA was observed. On the other hand, $I_f$ was similar to the $I_e$ characteristic but the value was found to be a value smaller than that of $I_e$ by one order or more.

According to the invention, catalyst particles for growing carbon fibers are obtained on a substrate without requiring any complex process and carbon fibers are satisfactorily grown from the catalyst particles. Also, the electron emitting device using the carbon fibers achieves good electron emitting characteristics. Moreover, according to the invention, distance between individual carbon fibers can be increased and as a result, an electric field can be sufficiently applied to the individual carbon fibers. Accordingly, an electron emitting device having excellent electron emitting characteristics can be efficiently manufactured and furthermore, a display using the electron emitting device can be efficiently provided.

What is claimed is:

1. A method for manufacturing carbon fiber, comprising:
   a step of forming a coated film containing a metal organic compound and a water-soluble polymer compound by applying an ink for producing a catalyst comprising a solution containing at least the metal organic compound and the polymer compound onto a substrate,
   a step of forming catalyst particles comprising a metal constituting said metal organic compound by heating said coated film, and
   a step of forming carbon fibers by bringing a gas containing carbon into contact with the catalyst particles.

2. The method according to claim 1, wherein said polymer compound is any one selected from the group consisting of polyvinyl alcohol, polyacrylic acids and polyvinylpyrrolidone.

3. The method according to claim 1, wherein said metal constituting the metal organic compound is any one selected from the group consisting of Pd, Fe, Co and Ni.

4. The method according to claim 1, wherein said metal organic compound is a metal organic complex.

5. The method according to claim 1, wherein a main solvent of said catalyst-manufacturing ink is water.

6. The method according to claim 1, wherein a main solvent of said catalyst-manufacturing ink is an organic solvent.

7. The method according to claim 1, wherein the step of heating said coated film is carried out in a non-oxidizing atmosphere.

8. The method according to claim 1, wherein the step of heating said coated film is a step of baking the coated film in an oxidizing atmosphere and then heating it in a reducing atmosphere.

9. The method according to claim 1, wherein said gas containing carbon is a hydrocarbon gas.

10. The method according to claim 1, wherein said gas containing carbon is a mixed gas of a hydrocarbon gas with hydrogen gas.

11. A method for manufacturing an electron emitting device containing carbon fibers connected to an electrode comprising at least:
    a step of forming a coated film containing a metal organic compound and a water-soluble polymer compound by applying an ink for producing a catalyst comprising a solution containing at least the metal organic compound and the water-soluble polymer compound onto the electrode,
    a step of forming catalyst particles comprising a metal constituting said metal organic compound on said electrode by heating said coated film, and
    a step of forming carbon fibers by bringing a gas containing carbon into contact with the catalyst particles.

12. The method according to claim 11, wherein said polymer compound is any one selected from the group consisting of polyvinyl alcohol, polyacrylic acids and polyvinylpyrrolidone.

13. The method according to claim 11, wherein said metal constituting the metal organic compound is any one selected from the group consisting of Pd, Fe, Co and Ni.

14. The method according to claim 11, wherein said metal organic compound is a metal organic complex.

15. The method according to claim 11, wherein said gas containing carbon is a mixed gas of a hydrocarbon gas with hydrogen gas.

16. A method for manufacturing a display using a plurality of electron emitting devices, wherein said electron emitting devices are manufactured by the method according to claim 11.

* * * * *

UNITED STATES PATENT AND TRADEMARK OFFICE
CERTIFICATE OF CORRECTION

PATENT NO. : 7,074,380 B2
APPLICATION NO. : 10/661626
DATED : July 11, 2006
INVENTOR(S) : Takashi Iwaki et al.

It is certified that error appears in the above-identified patent and that said Letters Patent is hereby corrected as shown below:

COLUMN 1

Line 24, "a" (first occurence) should read --an--;
    Line 25, "emitter." should read --emitter--; and
    Line 37, "a" should read --an--.

COLUMN 2

Line 2, "is existed" should read --exists--.

COLUMN 4

Line 25, "invention." should read --invention--; and
    Line 36, "invention." should read --invention--.

COLUMN 5

Line 28, "an" should read --a--; and
    Line 53, "invention." should read --invention--.

COLUMN 6

Line 5, "recrystalization" should read --recrystallization--; and
    Line 37, "invention." should read --invention--.

COLUMN 7

Line 59, Close up right margin;
    Line 60, Close up left margin;
    Line 63, "5C," should read --FIGS. 5C,--; and
    Line 67, "FIGS. 6C-1" should read --FIG. 6C-1--.

COLUMN 8

Line 2, "FIGS. 6C-2" should read --FIG. 6C-2--.

COLUMN 9

Line 65, "carried" should read --carried out--.

UNITED STATES PATENT AND TRADEMARK OFFICE
CERTIFICATE OF CORRECTION

PATENT NO. : 7,074,380 B2
APPLICATION NO. : 10/661626
DATED : July 11, 2006
INVENTOR(S) : Takashi Iwaki et al.

It is certified that error appears in the above-identified patent and that said Letters Patent is hereby corrected as shown below:

COLUMN 10

Line 55, "an" should read --a--; and
Line 59, "etraction" should read --extraction--.

Signed and Sealed this

Sixth Day of February, 2007

JON W. DUDAS
*Director of the United States Patent and Trademark Office*